United States Patent Office 2,789,201
Patented Apr. 16, 1957

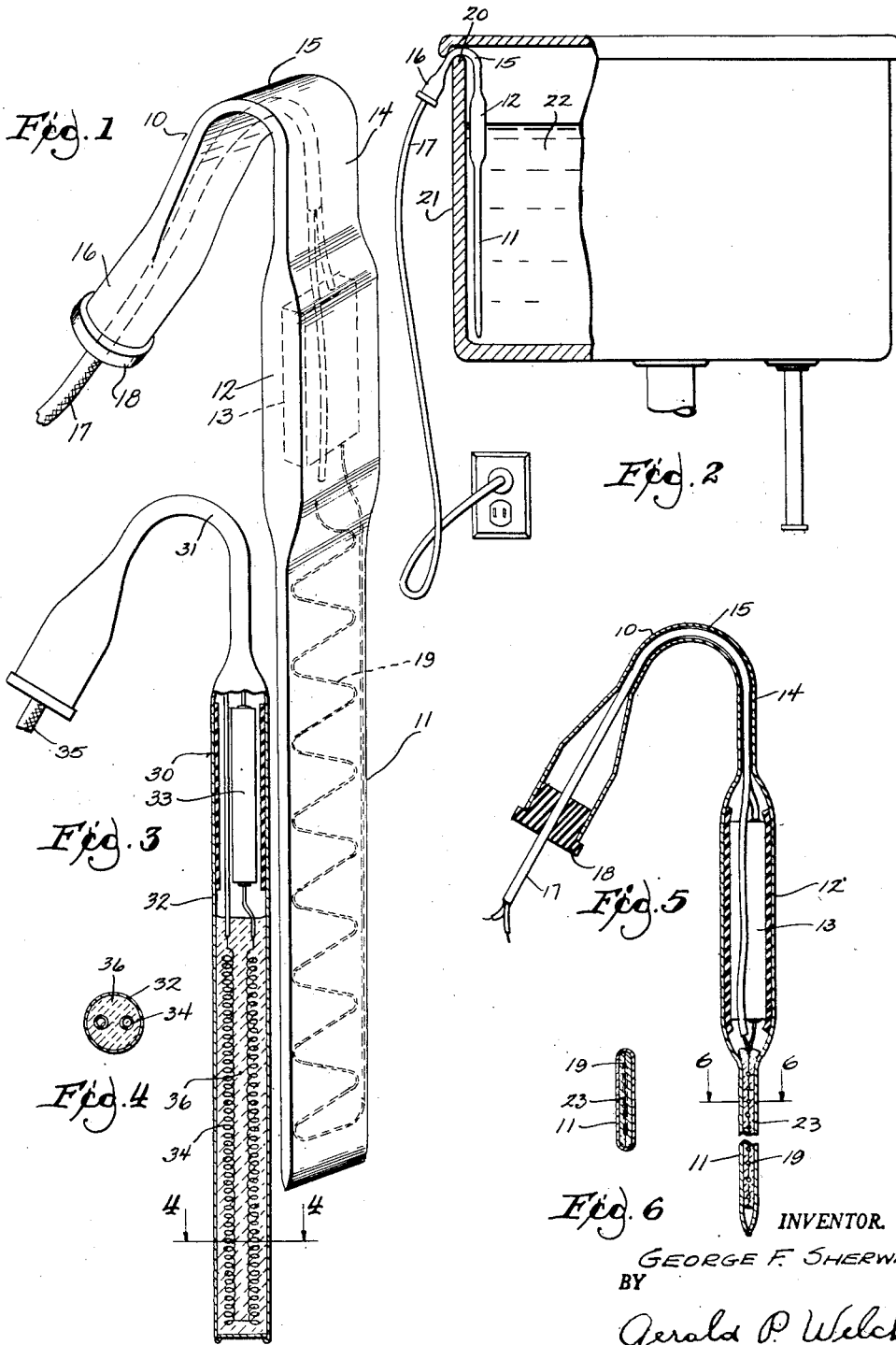

2,789,201

IMMERSION HEATERS FOR BATHROOM TANKS

George Frank Sherwin, Milwaukee, Wis.

Application May 3, 1954, Serial No. 427,046

1 Claim. (Cl. 219—41)

This invention relates to improvements in heaters for bathroom tanks, and more particularly to a novel heater for the purpose of the immersion type.

An object of the invention is to provide an immersion heater of the type provided with a thermostat for keeping the water in a bathroom tank at or near room temperature.

Another object of the invention is to so position the thermostat in the device that maximum efficiency in operation of the heater will result.

Other and further objects of the invention will appear as the description proceeds, reference being had to the accompanying drawing, in which:

Fig. 1 is a view in perspective of a heater for bathroom tanks embodying the invention.

Fig. 2 is a front view of a bathroom tank partially broken away showing the heater in position for use.

Fig. 3 is a vertical sectional view of another form of heater.

Fig. 4 is a view taken on line 4—4 of Fig. 3.

Fig. 5 is a vertical sectional view of the type of heater illustrated in Fig. 1.

Fig. 6 is a view taken on line 6—6 of Fig. 5.

Referring more particularly to the drawings, the numeral 10 refers to the device generally, and as shown in Fig. 1 includes a tubular element, flattened for a portion of its length as at 11, with an enlarged portion at 12 enclosing a thermostat 13 communicating with a flattened portion 14 bent into a hook formation as at 15 and terminating in a round tubular end 16.

An electrical conduit 17 enters the tubular end 16 through the circular plug 18 and forms a circuit with the thermostat 13 and the heating coil 19 disposed in the flattened portion 11 of the device 10.

In Fig. 2 the device 10 is suspended by the hook formation 15 over the upper edge 20 of the bathroom tank 21, and is so disposed that the thermostat 13 is held in the upper strata of the water 22 when the tank 21 is full.

In Fig. 3 another form of the device is shown in which the device 30 has a flattened hooked portion 31 and a tubular body portion 32 housing the thermostat 33 and the coil 34 forming a circuit with the electrical conduit 35.

In use, as shown in Fig. 2, the thermostat 13 is so constructed that when the water 22 is cooler than room temperature the heating coil 19 will be energized. When the temperature of the water 22 equals the temperature of the room, the thermostat 13 will interrupt the current and the coil 19 will be de-energized. By this means, condensation of moisture exteriorly on the bathroom tank 21 will be entirely eliminated, and a minimum of electrical current will be put to use. The coil 19 is embedded in an insulating and fire-resistant medium or material 23, and in the device shown in Fig. 3, the coil 34 is entirely covered by a similar insulating material 36.

It will be understood that the device is capable of many modifications in structure and design, without departing from the spirit of the invention, within the scope of the appended claims.

Having thus described the invention, what is claimed and desired to be secured by Letters Patent of the United States, is:

An immersion heater for bathroom tanks including a flat tubular housing adapted for suspension vertically in said tank, an integral hooked portion on said housing adapted to engage over the upper edge of said tank, an enlarged portion in said housing under the hooked portion, a crimped type thermostat within said enlarged portion, a heating coil in that part of the housing depending beneath said enlarged portion, and an electrical conduit forming a circuit with said coil and thermostat.

References Cited in the file of this patent

UNITED STATES PATENTS

| | | |
|---|---|---|
| 1,075,517 | Taylor | Oct. 14, 1913 |
| 1,222,669 | Purnell | Apr. 17, 1917 |
| 1,689,198 | Gagelman | Oct. 30, 1928 |
| 1,837,000 | Wertz | Dec. 15, 1931 |
| 2,039,641 | Fichtner | May 5, 1936 |
| 2,201,703 | Sage | May 21, 1940 |
| 2,527,115 | Bosworth | Oct. 24, 1950 |
| 2,712,590 | Doble | July 5, 1955 |